KAREL R. DAHMEN
INVENTOR.

KAREL R. DAHMEN
INVENTOR.

BY *Jerry B. Peterson*

ATTORNEY

United States Patent Office 3,701,827
Patented Oct. 31, 1972

3,701,827
PROCESS AND APPARATUS FOR THE PRODUCTION OF LARGE PARTICLE-SIZE, LOW STRUCTURE CARBON BLACK
Karel R. Dahmen, Houston, Tex., assignor to Continental Carbon Company, Houston, Tex.
Filed July 13, 1971, Ser. No. 162,064
Int. Cl. C09c 1/50
U.S. Cl. 423—456                                29 Claims

ABSTRACT OF THE DISCLOSURE

Large particle-size, low structure carbon black resembling thermal black is produced by a process and apparatus involving two stages of introduction of hydrocarbon oil feedstock. The first stage involves the introduction of a minor portion of the total feedstock axially into a tubular reactor section, the reaction products from which pass into an enlarged-diameter section into which the major portion of the feedstock is introduced radially in a downstream angle through a plurality of nozzles. The first-stage feedstock is heated by hot combustion gases, and supplementary heat is added to the enlarged-diameter section at a plurality of locations along that section.

BACKGROUND OF THE INVENTION

Field of the invention

This invention relates to the production of large particle-size, low structure oil furnace carbon black resembling thermal black. More particularly, the invention relates to the manufacture of such black by a process and apparatus involving two stages of introduction of hydrocarbon oil feedstock and multiple-stage addition of heat. The first stage involves the introduction of hot combustion gases and a minor portion of the total feedstock axially into a tubular reaction section, the reaction products from which pass into an enlarged-diameter section to which the major portion of the feedstock is introduced radially at a downstream angle through a plurality of nozzles. At about the point of injection of the major portion of the feedstock, a secondary reaction stage is initiated by the introduction of supplementary heat, after which the reaction products pass into an enlarged-diameter third-stage section into which additional heat is introduced at a plurality of locations along that section.

Carbon blacks are produced by several processes; namely, the channel or impingement, furnace combustion, oil furnace, acetylene, lampblack, and furnace thermal processes.

The channel or impingement blacks are produced by impingement of small natural gas flames on the surface of metal collection elements. Channel blacks have been substantially relegated to specialty uses and ink manufacture by the other blacks produced by later developed processes, and manufacture of channel blacks is not considered or included in the scope of the present invention.

The furnace combustion process produces carbon blacks that are generally used for reinforcement of rubber used as tire carcass stocks in which low heat generation is important. These blacks are generally referred to as the gas furnace blacks and are produced by the thermal decomposition of a portion of a feedstock, with the remainder of the feedstock being combusted under oxygen deficient conditions to provide the necessary heat for the carbon forming reaction. Basically the feedstock for furnace combustion blacks is natural gas; however, the practice of enriching the feedstock by injecting liquid hydrocarbon is becoming more prevalent as the natural gas fields become depleted.

The oil furnace process produces the carbon blacks that are used more than all others by the manufacturers of rubber for tires and related applications. These rubber reinforcing blacks are produced by the thermal decomposition or cracking of hydrocarbon feedstocks that are at least partially liquid at normal ambient conditions and have a substantial aromatic hydrocarbon content. The feedstock is introduced into an enclosed furnace to be contacted with the heat of decomposition generated by the separate combustion of a mixture of fuel and air to form the carbon black from the oil feedstock. The combined stream of carbon black suspended in combustion gases is quenched with water at the appropriate point in the reaction to reduce the temperature sufficiently to terminate the carbon black forming reaction.

The combustion gas stream containing suspended particles of carbon black is subjected to a series of steps to separate the carbon black from the gas and provide for the collection of the carbon black for additional processing. This invention is concerned only with the reactor and reaction process by which the carbon black is created, so this disclosure is limited to the furnace reactor or production portion of the manufacturing process.

Oil furnace carbon black reactors are generally of cylindrical elongate configuration and usually but not always disposed horizontally. The reactor conventionally consists of axially aligned zones of combustion, reaction and quench; with these various zones having different longitudinal dimensions and frequently having different diameters. The fuel and oxygen-containing gas mixture is introduced in varied patterns into the combustion zone.

The characteristics of the oil furnace blacks produced in the reactor vary considerably and are dependent upon combustion conditions, stream flow pattern, composition of the hydrocarbon feedstock and other raw materials, reaction time, and operating conditions within the reactor during production.

Acetylene blacks are produced by the thermal dissociation of acetylene into carbon and hydrogen.

Lampblack is produced by the burning of oils in open, shallow pans in a restricted air supply.

The furnace thermal process produces the coarsest black. For example, the average particle sizes and surface areas for the various blacks are:

|  | Particle size, A | Surface area ($N_2$), m.²/gm. |
|---|---|---|
| Channel or impingement | 100–270 | 100–1,125 |
| Furnace | 170–700 | 20–200 |
| Acetylene | 350–500 | 60–70 |
| Lampblack | 500–1,000 | 20–95 |
| Thermal | 1,500–5,000 | 6–15 |

In addition, thermal blacks have very low structure. These thermal blacks are usually produced by the thermal decomposition of a gaseous feedstock, in the absence of air, by intermittent operation of an insulated furnace using alternate heating and production cycles. Thermal blacks are used in applications requiring a high carbon black loading and minimal reinforcing of the rubber.

Description of the prior art

There is nothing novel per se about the initial formation of carbon black in the first stage of applicant's process. For example, see FIG. 1 of U.S. Pat. 3,256,066. Likewise, there is nothing novel per se about the applicant's method of introduction of supplemental heat into the enlarged second and subsequent stages of the process by tangential flow. See U.S. Pat. 3,235,334; U.S. Pat. 2,419,565; application Ser. No. 776,038, filed Nov. 15, 1968, now abandoned, and its continuation-in-part, application Ser. No. 123,453, filed Mar. 11, 1971; and co-pending application Ser. No. 863,112, filed Oct. 2, 1969. Also, U.S. Pat 2,895,804 discloses the injection of feedstock radially at a downstream angle, U.S. Pat. 3,560,164 discloses a specific reactor shell embodying the general idea of using a large-diameter reactor and low flow velocities to produce large-particle blacks. None of these references disclose the formation of thermal black and there is no suggestion in the prior art that the disclosures of these various features can be combined.

South African patent application 69/7557 describes a process which allegedly produces black having properties similar to thermal black. As far as we know, however, there is no prior art showing applicant's method and apparatus for producing thermal black.

OBJECTS OF THE INVENTION

An object of this invention is to provide a process and apparatus for continuously producing thermal black from an oil feedstock.

Another object of this invention is to produce large particle-size carbon black by first dispersing a limited quantity of carbon black nuclei (carbon black being in an initial stage of formation) into a zone saturated with hydrocarbon feedstock in the form of liquid mist or vapor, in order that, with the aid of supplemental heat, pyrolysis of the feedstock and growth of the nuclei will be initiated and continued so as to form such black.

Another object of this invention is to promote gradual and slow formation of carbon black on previously formed carbon black nuclei by providing the required heat, not at one point but, in various stages in the process.

Another object is to produce thermal black having low structure.

Another object of this invention is to accomplish the foregoing objects without the formation of troublesome coke deposits on the walls of the reaction chamber.

SUMMARY OF THE INVENTION

This invention is a process and apparatus for the manufacture of large particle-size carbon black resembling thermal black by a process and apparatus involving two stages of introduction of hydrocarbon oil feedstock and multiple-stage addition of heat. The first stage involves the introduction of hot combustion gases and a minor portion of the total feedstock axially into a tubular reaction section, the reaction products from which pass into an enlarged-diameter section to which the major portion of the feedstock is introduced radially at a downstream angle through a plurality of nozzles. At about the point of injection of the major portion of the feedstock, a secondary reaction stage is initiated by the introduction of supplementary heat, after which the reaction products pass into an enlarged-diameter third-stage section into which additional heat is introduced at a plurality of locations along that section. Helical flow of hot combustion gases is preferred.

DESCRIPTION OF THE PREFERRED EMBODIMENTS

Figure 1:
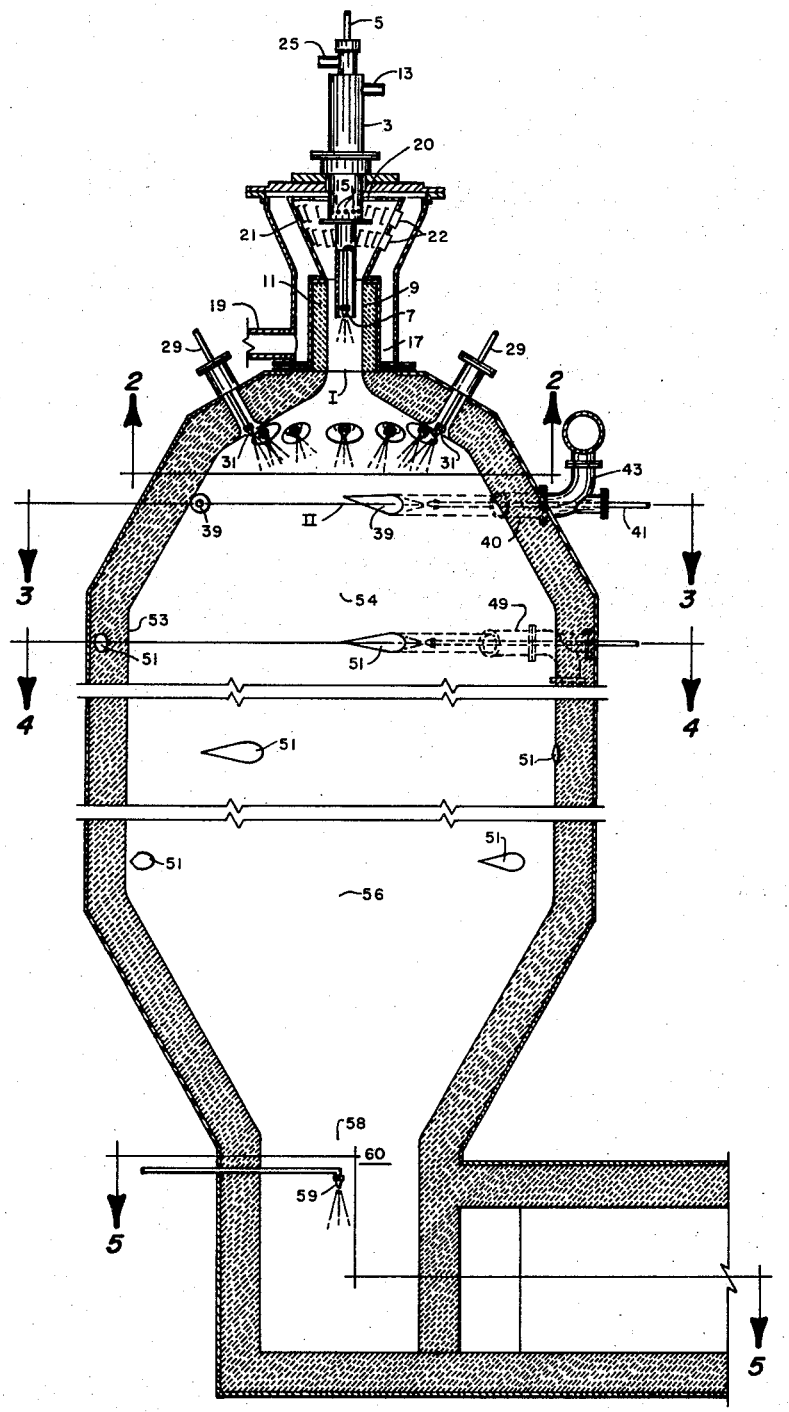
FIG. 1 is a side view, mostly in section, illustrating a preferred embodiment of the invention.
Figure 2:
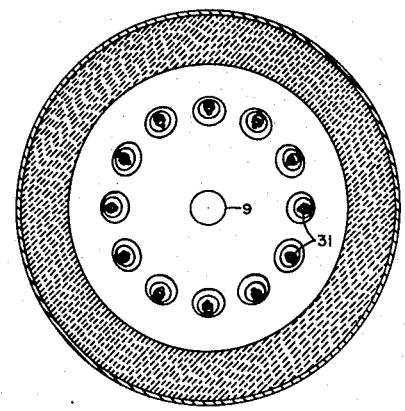
FIG. 2 is a cross-sectional view of the portion of the apparatus taken along line 2—2 of FIG. 1.
Figure 3:
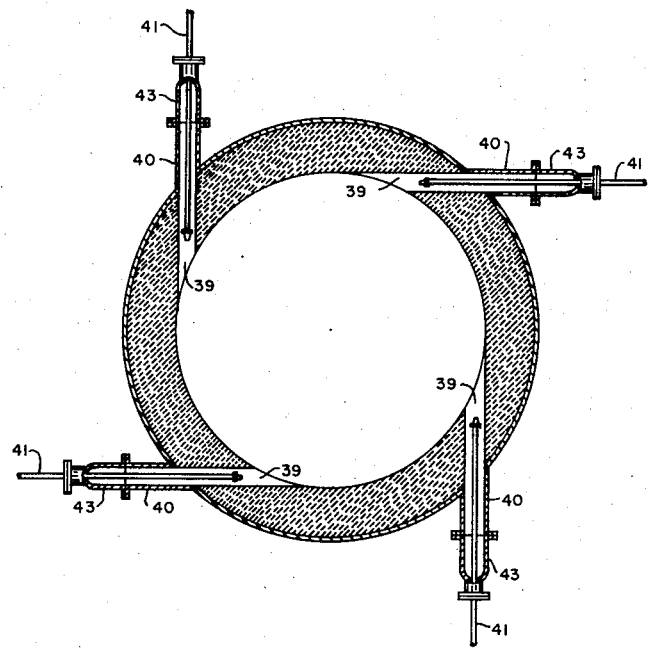
FIG. 3 is a cross-sectional view of the portion of the apparatus taken along the line 3—3 of FIG. 1.

FIG. 1 shows a preferred embodiment of the reactor and associated apparatus. As indicated in the drawing, the reactor is preferably shown in a vertical position with downward flow of the feedstock, combustion gases, and reaction products; however the apparatus could be arranged for upward or horizontal flow.

The initial stage of the reaction takes place at the area designated by Roman numeral I. A minor portion of the total feedstock for the process is introduced into burner and feedstock injection assembly 3 through pipe 5 and then through nozzle 7 into tubular reactor 9 surrounded by refractory liner 11. This portion can be 5–20%, preferably 5–15% and most preferably 7–12%. Greater portions could possibly be used; however, in the case the heat supplied to the initial stage would be limited so that the excess amount of initial feedstock would not be converted into nuclei in the initial stage but instead would simply pass into the second stage without being converted. A suitable combustion fuel such as natural gas introduced through pipe 13 and enters the upper portion of the reactor through holes 15. Air for combustion of this fuel is preferably supplied to annulus 17 through pipe 19, and preferably enters the annulus in tangential flow. A portion of this air enters the top of the reactor through the top of metallic combustion chamber 21 through opening 20, the remainder of the combustion air entering through louvers 22 which are preferably arranged so as to provide for tangential introduction of air into the side of the combustion chamber 21. A small amount of axial air is normally supplied through pipe 25.

The apparatus described above is more fully described in U.S. Pat. 3,256,066, and particularly FIG. 1 thereof; however, other tubular reactor configurations could be used to initiate the first stage of the nuclei formation.

The burner and feedstock injection assembly is described more fully in U.S. Pat. 3,443,761. Other suitable burner and feedstock injection assemblies can be used; for example, the assemblies disclosed in co-pending applications Ser. Nos. 59,961 and 59,962, both filed July 31, 1970.

The purpose of initiating the first-stage reaction is to form carbon black nuclei for further formation of carbon black in a manner to be described hereinbelow.

The main or major portion of the feedstock is introduced in the second stage of the process through a plurality of pipes 29 terminating in nozzles 31. These pipes 29 are preferably focused at a downstream point II on the axis of the reactor at an angle of, for example, 30°–60° and preferably 40°–50° from the axis. There are at least six of these feed pipes 29 and preferably at least eight, and most preferably twelve at an angle of 45°. This large number of nozzles is preferred to obtain a large total feedstock rate with low nozzle pressure and, therefore, a short projection of the spray pattern. Wide angle full jet nozzles can be used to form a mist of feedstock droplets, through which the already formed nuclei are propelled at high speed.

A plurality (preferably four) of combustion ports 39 are located immediately downstream of nozzles 31. Hot combustion gases are supplied tangentially to the reactor through these ports 39. These hot combustion gases are produced in burners 40 by the burning of a suitable combustion fuel (such as natural gas) supplied through pipes 41 with air being supplied through conduits 43.

Combustion of the hydrogen being released by pyrolysis of the feedstock should essentially be avoided, so as to prevent the generation of excessive heat in this stage of the process. Therefore, air-to-gas ratios of about 10:1 should be used. The tangential introduction of combusted gas should be in the same direction as the helical motion of the nuclei so that the relative motion of particles is limited.

Throughout this disclosure and appended claims, the term "air" shall mean air, oxygen-enriched air, oxygen, or other oxygen-containing gas.

Figure 4:
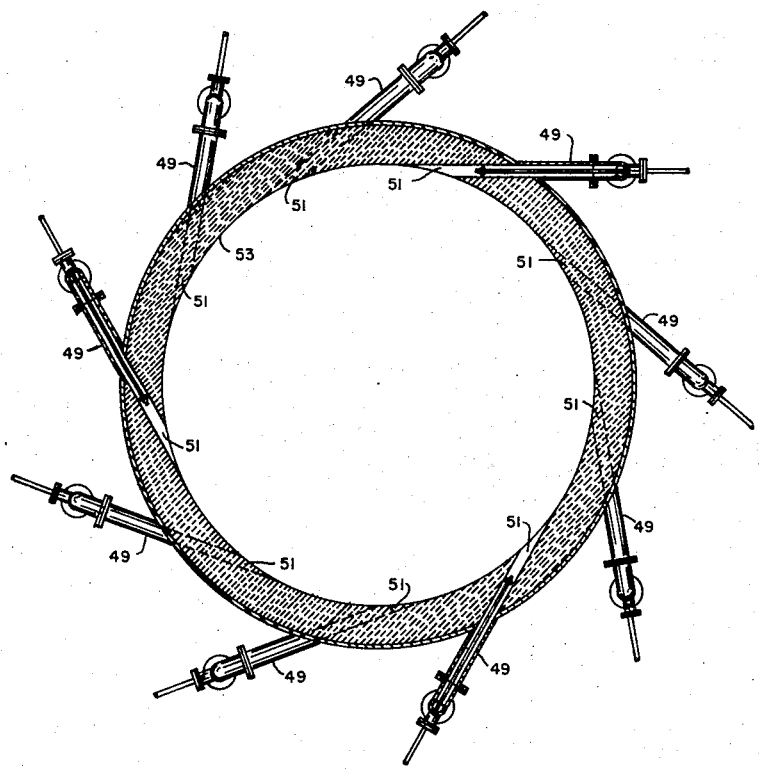
FIG. 4 is a cross-sectional view of the portion of the apparatus taken along the line 4—4 of FIG. 1.
Figure 5:
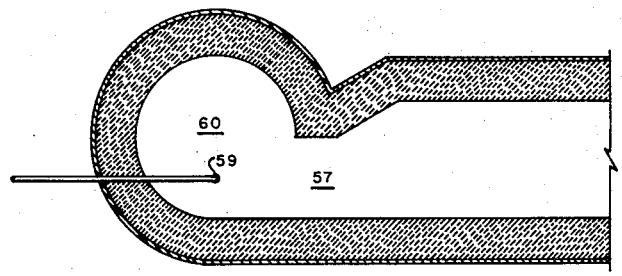
FIG. 5 is a cross-sectional view of the portion of the apparatus taken along the line 5—5 of FIG. 1.

The reactants then pass into the third stage of the process; that is, into the enlarged middle section of the reactor where they can continue to grow in the quiet and dilluted atmosphere, free of oxygen and at a temperature maintained at a level sufficient to complete the reaction at a slow rate. The heat necessary to maintain this temperature is gradually supplied over the length of the enlarged middle section of the reactor at a plurality (preferably three) of positions of tangential introduction, each consisting of a plurality (preferably three) of burners 49. Each burner 49 is supplied by combustion fuel and oxygen substantially in the same manner as previously described in connection with burners 40. Ports 51 enter the reactor in tangential fashion in order to sustain helical flow along the refractory wall 53. Preferably, the positions of the different sets of ports 51 are staggered, as shown in FIG. 4, rather than being vertically aligned.

It is within the scope of this invention to include any or all of ports 39 and/or 51 at a slight downstream angle in the manner of ports 15 of U.S. Pat. 2,375,798 in order that the helically-moving combustion products can move downstream at more nearly the same velocity as the reaction products.

For practical reasons the cross-sectional area at the discharge end is reduced gradually at the downstream end of the reactor prior to the quench section. The outlet 57 is preferably tangential so as to limit turbulence as much as possible. The reaction is terminated by water quenched spray or sprays 59.

Structure formation is preferably suppressed by the use of potassium ions, preferably injected into the reactor at the beginning of the second stage. It is desirable to obtain rapid diffusion of the potassium ions over the large area of this section. A low quantity, pneumatic atomizing nozzle can be used to produce a solution of potassium nitrate (lower evaporation temperature than potassium chloride) in methyl alcohol, preferably by air aspiration. The injection of this additive should be radial.

Without intending to limit in any way the scope of this invention, the following approximate dimensions are preferred:

|  | Suitable | Preferred |
|---|---|---|
| Inside diameter of reaction tube 9 | 6″–10″ | 8″ |
| Length of reaction tube 9 | 24″–36″ | 30″ |
| Vertical distance I–II | 14″–26″ | 20″ |
| Diameter of circle formed by nozzles 31 | 20″–24″ | 21″ |
| Vertical distance from II center of reactor at at point 54 | 34″–58″ | 46″ |
| Diameter of middle section | 6′–10′ | 8′ |
| Vertical distance from point 54 to centerline of first port 51 | 9″–15″ | 1′ |
| Vertical distance between ports 51 | 45″–75″ | 5′ |
| Vertical distance point 56 to point 58 | 45″–75″ | 5′ |
| Diameter of outlet 60 | 30″–48″ | 3′ |
| Overall length of reactor (from upstream end of refractory 11 to point 58) | 20′9″–33′9″ | 25′ |

Without intending in any way to limit the scope of the invention, the following approximate operating conditions are preferred:

|  | Suitable | Preferred |
|---|---|---|
| First Stage: |  |  |
| Combustion air, s.c.f.h | 20,000–30,000 | 25,0000 |
| Combustion gas, s.c.f.h | 2,000–3,000 | 2,500 |
| Feedstock (conventional carbon black oil), g.p.h | 40–60 | 50 |
| Second Stage: |  |  |
| Total feedstock, g.p.h (Injected through twelve fullcone atomizing sprays, 120° spray angle, 3/32″ orifice diameter at approx. 8 p.s.i.g. spray pressure) | 450–750 | 600 |
| Burners 40: |  |  |
| Combustion air to each burner, s.c.f.h | 30,000–50,000 | 40,000 |
| Gas to each burner, s.c.f.h | 3,000–5,000 | 4,000 |
| Total Combustion air, s.c.f.h | 120,000–200,000 | 160,000 |
| Total gas, s.c.f.h | 12,000–20,000 | 16,000 |
| Third Stage: |  |  |
| Burners 49 (preferably three each at three levels): |  |  |
| Combustion air to each burner, s.c.f.h | 15,000–25,000 | 20,000 |
| Gas to each burner, s.c.f.h | 1,500–2,500 | 2,000 |
| Total combustion air, s.c.f.h | 135,000–215,000 | 180,000 |
| Total gas, s.c.f.h | 13,500–21,500 | 18,000 |

While we have thus described the preferred embodiments of the present invention, many variations will be suggested to those skilled in the art. The foregoing description and examples should therefore not be considered limitative; and all such variations and modifications as are in accord with the principles described are meant to fall within the scope of the appended claims.

I claim:

1. A process for manufacturing large particle-size carbon black resembling thermal black from an oil feedstock comprising the steps of continuously and simultaneously:
   (a) spraying a minor portion of the total feedstock, together with the hot combustion products from the burning of a hydrocarbon fuel, into a first-stage reaction zone under conditions in which a carbon black-forming reaction is initiated;
   (b) passing the reaction products and gases from step (a) into an enlarged secondary reaction zone of circular cross section;
   (c) introducing the major portion of the total feedstock into the upstream portion of said secondary reaction zone, said major portion being introduced as a plurality of sprays equally spaced about the cross section of said zone and focused toward a downstream point along the axis of said secondary reaction zone;
   (d) tangentially introducing secondary hot combustion gases into said secondary reaction zone at a position immediately downstream of the sprays of step (c), and allowing the reaction products and gases to pass into a third reaction zone which is of circular cross section and of larger diameter than said secondary reaction zone;
   (e) tangentially introducing tertiary hot combustion gases into said third reaction zone at a plurality of positions along the length of said third reaction zone; and
   (f) terminating the reaction by quenching the reaction products downstream of said third reaction zone.

2. The process of claim 1 in which:
   step (a) is carried out in a tubular reactor into which the feedstock is introduced axially into a whirling stream of said combustion products, the amount of said feedstock being 5–20% of the total feedstock used in the process;
   the feedstock sprays of step (c) are at least six and are focused at an angle of 30°–60° from the axis of the secondary reaction zone;
   the secondary hot combustion gases of step (d) are formed by the combustion of a hydrocarbon fuel using an air-to-gas ratio of about 10:1, said secondary gases being introduced as a plurality of streams spaced approximately equidistantly about the circumference of said secondary reaction zone;
   the tertiary hot combustion gases of step (e) are introduced at each of said locations as a plurality of streams spaced approximately equidistantly about the circumference of said third reaction zone.

3. The process of claim 2 in which the flow of reaction products through said reaction zones is in a downward direction.

4. The process of claim 2 in which the flow of reaction products through said reaction zones is in an upward direction.

5. The process of claim 2 in which the flow of reaction products through said reaction zones is in a horizontal direction.

6. The process of claim 3 in which the amount of feedstock introduced in step (a) is about 5–15% of the total feedstock.

7. The process of claim 4 in which the amount of feedstock introduced in step (a) is about 5–15% of the total feedstock.

8. The process of claim 5 in which the amount of feedstock introduced in step (a) is about 5-15% of the total feedstock.

9. The process of claim 3 in which the amount of feedstock introduced in step (a) is about 7-12% of the total feedstock.

10. The process of claim 4 in which the amount of feedstock introduced in step (a) is about 7-12% of the total feedstock.

11. The process of claim 5 in which the amount of feedstock introduced in step (a) is about 7-12% of the total feedstock.

12. The process of claim 2 in which:
the amount of feedstock introduced in step (a) is about 7-12% of the total feedstock;
the feedstock sprays of step (c) are twelve and are focused at an angle of about 40°-50°;
the secondary hot combustion gases of step (d) are introduced as four streams;
the tertiary hot combustion gases of step (e) are introduced as three streams at each of three positions.

13. The process of claim 12 in which the flow of reaction products through said reaction zones is in a downward direction.

14. The process of claim 12 in which the flow of reaction products through said reaction zones is in an upward direction.

15. The process of claim 12 in which the flow of reaction products through said reaction zones is in a horizontal direction.

16. Apparatus for the manufacture of carbon black comprising:
(a) a first enclosed tubular reactor section for initiating a carbon-forming reaction, said first section including means for spraying a carbon black oil feedstock into the upstream end thereof and means for introducing hot combustion gases into said first section upstream of the feedstock spray;
(b) a second enclosed reaction section downstream of and in open communication and axial alignment with said first section, said second section being of larger circular cross section than said first section;
(c) a plurality of main oil feedstock sprays equally spaced about the upstream cross section of said second section, said sprays being positioned so as to focus their spray patterns toward a downstream point along the axis of said second section;
(d) means for tangentially introducing hot combustion gases into said second section at a position downstream of said main sprays, said position being in the vicinity of the focus point of said main sprays;
(e) a third enclosed reaction section downstream of and in open communication and axial alignment with said second section, said third section being of larger circular cross sectional than said second section;
(f) means for tangentially introducing hot combustion gases into said third reaction section at a plurality of positions along the length of said third section; and
(g) means for introducing a quenching medium into said apparatus downstream of said third section.

17. The apparatus of claim 16 in which:
said means for introducing hot combustion gases into said first section include means for imparting a whirling motion to said gases;
the main oil feedstock sprays are at least six in number and are focused at an angle of 30°-60° from the axis;
means (d) comprises means for introducing said gases as a plurality of streams spaced approximately equidistantly about the circumference of said second section;
means (f) includes means for introducing said gases into said third reaction section as a plurality of streams spaced approximately equidistantly about the circumference of said third section, at each of said plurality of positions.

18. The apparatus of claim 17 in which the axis is vertical and the first section is at the top.

19. The appaartus of claim 17 in which the axis is vertical and the first section is at the bottom.

20. The apparatus of claim 17 in which the axis is horizontal.

21. The apparatus of claim 17 in which the diameter of said second section increases in a downstream direction throughout its length.

22. The apparatus of claim 21 in which the main feedstock sprays are twelve in number and are focused at an angle of about 40°-50°.

23. The apparatus of claim 22 in which the axis is vertical and said first section is at the top.

24. The apparatus of claim 22 in which the axis is vertical and said first section is at the bottom.

25. The apparatus of claim 22 in which the axis is horizontal.

26. The apparatus of claim 22 in which:
the means (d) includes four combustion ports;
the means (f) includes three combustion ports at each of said three positions.

27. The apparatus of claim 26 in which the axis is vertical and said first section is at the top.

28. The apparatus of claim 26 in which the axis is vertical and said first section is at the bottom.

29. The apparatus of claim 26 in which the axis is horizontal.

References Cited
UNITED STATES PATENTS

| | | | |
|---|---|---|---|
| 3,607,058 | 9/1971 | West | 23—209.4 |
| 3,592,596 | 7/1971 | Henderson | 23—209.4 |
| 3,560,164 | 2/1971 | Venable | 23—259.5 |
| 3,523,759 | 8/1970 | Kidd | 23—259.5 |
| 3,256,066 | 6/1966 | Higgins | 23—259.5 |
| 3,235,334 | 2/1966 | Helmers | 23—209.4 |
| 2,895,804 | 7/1959 | Heller | 23—209.4 |
| 2,419,565 | 4/1947 | Krejci | 23—259.5 X |
| 2,375,795 | 5/1945 | Krejci | 23—209.8 |

EDWARD J. MEROS, Primary Examiner

U.S. Cl. X.R.

23—259.5